H. L. DUNKLE.
APPARATUS FOR FILTERING BLACK ASH SOLUTIONS.
APPLICATION FILED JUNE 14, 1919.
1,320,324.
Patented Oct. 28, 1919.
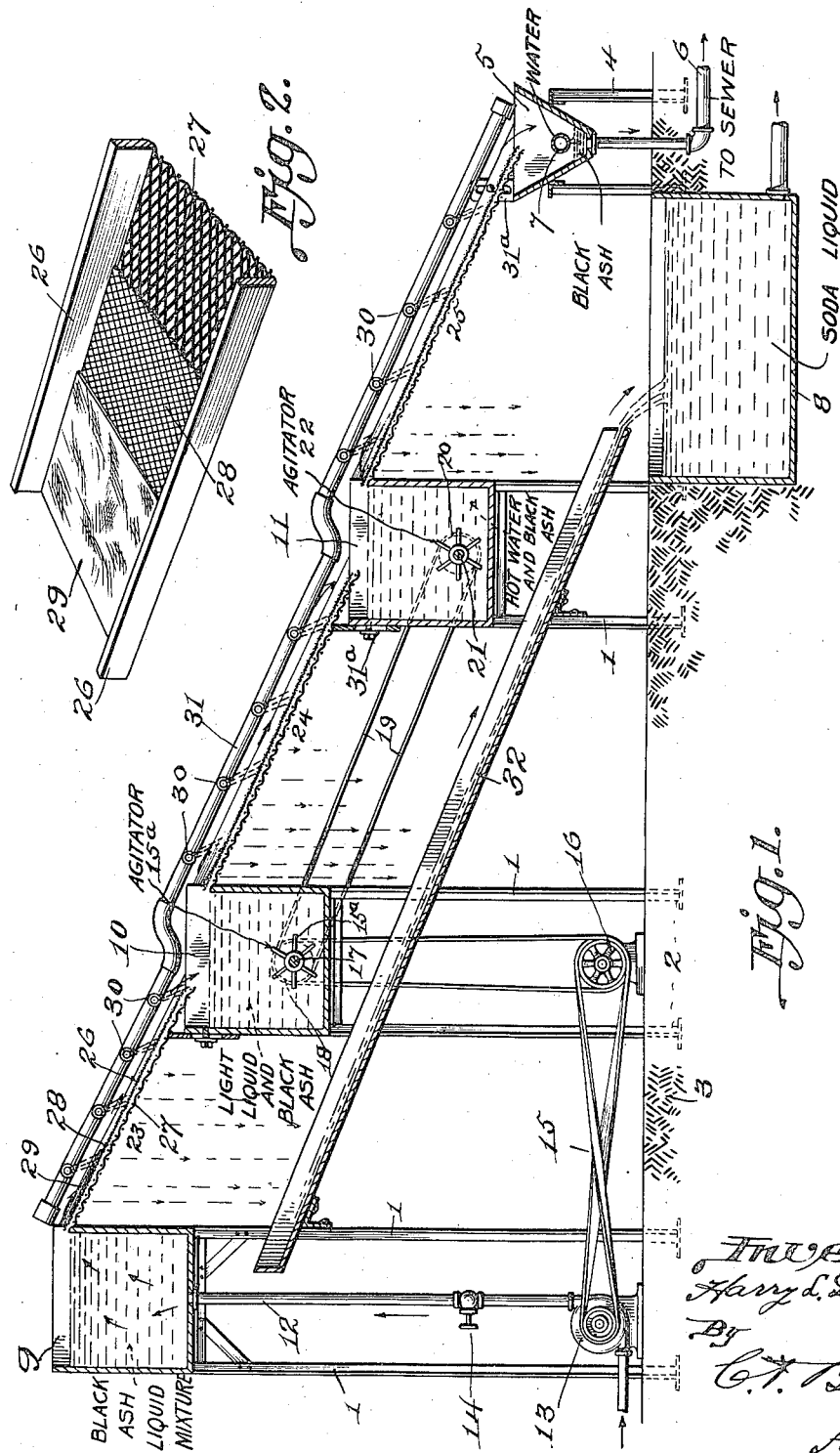

UNITED STATES PATENT OFFICE.

HARRY L. DUNKLE, OF WASHINGTON, DISTRICT OF COLUMBIA.

APPARATUS FOR FILTERING BLACK-ASH SOLUTIONS.

1,320,324. Specification of Letters Patent. Patented Oct. 28, 1919.

Application filed June 14, 1919. Serial No. 304,287.

*To all whom it may concern:*

Be it known that I, HARRY L. DUNKLE, a citizen of the United States, residing at Washington, in the District of Columbia, have invented certain new and useful Improvements in Apparatus for Filtering Black-Ash Solutions, of which the following is a specification.

This invention relates to apparatus for treating a mixture of carbonated liquid and black ash, and pertains especially to an apparatus particularly adapted for separating such liquid from black ash.

The object of the invention is to provide an apparatus through which a solution of black ash and carbon liquor is passed so as to separate the same, and to deliver and preserve the liquor containing soda for various uses.

A further object of the invention is to provide a plurality of liquid containers so arranged with respect to each other as to permit the liquid to flow by gravity over screens between the containers from one container to another, whereby the carbon liquor is separated from black ash and collected in a collecting trough leading to a storage tank.

A still further object of the invention is to provide an apparatus for separating liquid containing a semi-floating material as black ash from the latter, such apparatus comprising a plurality of vessels or containers arranged in step-like position and connected by filtering screens for carrying blask ash from one to another of said containers while the liquid as desired for preservation is filtered through the screens between the containers and collected into a receiving or storage tank.

Various other objects, advantages and improved results are attainable in the practical application of the process and apparatus as will be hereinafter explained.

In the accompanying drawings forming part of this application:—

Figure 1 is a longitudinal sectional view of an apparatus embodying my invention.

Fig. 2 is a detail perspective view of the upper conveyer screen partly broken away.

The same reference characters denote the same parts throughout the several views of the drawings.

In carrying out my invention I employ trestles or stands 1 preferably having base ends as 2 embedded in a foundation as 3. These trestles are spaced apart in step-like arrangement so that they are of different lengths. A similar trestle 4 supports an ash receiving hopper 5 having a discharge pipe 6 and a pressure pipe 7 for forcing the contents of the hopper through the pipe 6. A liquid receiving or storage tank 8 is preferably contained in the foundation, and may have suitable pipe connections with a causticizing tank.

Each of the trestles 1 supports an open top box or container as 9, 10, and 11. The upper container 9 of highest elevation has an air induction pipe 12 at the bottom, and said pipe is connected with a centrifugal pump 13, and has a valve 14. The pump operates a belt 15 which operates a pulley 16 for operating an agitator 15ª in the bottom of the next container 10, and the shaft 17 of this agitator operates a pulley 18 and a belt 19 which operates a pulley 20 on a shaft 21 of a similar agitator 22, in the bottom of the lowest container 11. The containers are connected by inclined liquid filters 23, 24 and 25, comprising a frame or side inclosures 26, to which is secured a bottom coarse wire mesh forming an under screen 27 over which is secured a fine wire mesh forming an upper screen 28. Preferably there is a space between the screens 27 and 28 to facilitate cleaning and washing of the screens. In the event of unusual quantity of black ash being deposited upon the filter 23, I provide this filter with an apron or deckle 29 adjacent to the container 9, so as to prevent the upper portion of the filter 23 from filtering, and to insure the passage of black ash from this filter into the next container 10. A plurality of water spray pipes 30 extend across the filters and are supplied by a main pipe 31. These pipes direct the spray upon the filters so as to facilitate filtering of the liquid and to assist the movement of black ash from the screens. In order to adjust the filters as desired to insure gravity fall of the black ash, I provide the lower end thereof with an adjusting device as 31ª. The upper container 9 is supplied with a mixture of black ash and liquor and overflows upon the filter 23 which filters part of the liquid into a trough 32 extending under all the filters and discharges into the receiving tank. Black ash is discharged by gravity from the filter 23 into the next container 10, where the mixture is agitated and black ash is deposited from the container 10 onto the second filter 24, whence black ash is discharged into the third container 11, which is supplied with hot water, and then the black ash from this container is discharged upon the final filter 25 leading to the hopper. During the said movement of black ash over the fine screens from one container to another and finally into the hopper, the desired liquid filters through the screens into the trough.

Obviously the containers may have suitable pipe connections for supplying them, and the second container 10 contains a lighter liquid than the container 9 in which the process is initiated.

It will be understood that the black ash being semi-floating will be discharged from the containers onto the screens, and being in movement and of a character as powder or grain, will not be filtered through the screens, but will, by its own specific gravity assisted by the spray directed thereon, be conveyed over the screens, and permit the filtration of the liquid without changing its color and strength. In the event of the screens becoming clogged with black ash, a suitable hose may be attached to the water supply and directed against the under side of said screens, or steam or air may be used for this purpose.

It is well known that lime and soda ash dissolved in water results in a caustic liquor which is used in cooking wood to separate the fiber. After this liquor is once used it is evaporated into a thick liquor which is boiled and burned into a fine powder or granular condition which is mixed with a weak solution resulting in carbonate liquor by reason of black ash being contained therein, and it is this black ash liquor that is operated in my apparatus for removing the black ash and retaining or preserving the liquor containing soda.

Obviously the containers and filters may be multiplied so long as their relative step-like position is maintained for the inclined filters, it being important that the containers be arranged to overflow the mixture upon the filters, and it will be observed that the amount of liquid filtered through the filters diminishes from the first to the last filter while the black ash descends over the filters to the waste hopper.

Having thus described my invention what I claim as new and desire to secure by Letters Patent is:

1. In an apparatus as and for the purpose described, a plurality of liquid containers, inclined filters connecting the containers so that the liquid will overflow upon the filters and be filtered therethrough during the passage of semi-floating substance as black ash from one filter to another for removing the ash from the liquor.

2. In an apparatus as and for the purpose described, a plurality of liquid containers arranged in relative step-like form, inclined screen filters between the containers for filtering liquid therethrough and permitting passage thereover of semi-floating material as black ash from one to another of the containers for separating the black ash from the liquid, and means for collecting the filtered liquid in a body.

3. In an apparatus as and for the purpose described, a plurality of liquid containers arranged in relative step-like form, inclined screen filters between the containers for filtering liquid therethrough and permitting passage thereover of semi-floating material as black ash from one to another of the containers for separating the black ash from the liquid, agitators in certain of the containers, an air pipe leading into one of the containers, and a filtered liquid trough extending under the filters and under the containers.

4. In an apparatus as and for the purpose described, a plurality of liquid containers arranged in relative step-like form, inclined screen filters between the containers for filtering liquid therethrough and permitting passage thereover of semi-floating material as black ash from one to another of the containers for separating the black ash from the liquid, means for adjusting the filters so as to vary their inclined position, a blow pipe discharging into the bottom of the uppermost container, an agitator in each of the other containers, and a drip trough secured under the filters for conveying off the filtered liquid.

In witness whereof I hereunto set my hand in the presence of two witnesses.

HARRY L. DUNKLE.

Witnesses:
ROGER F. LANSDALE,
C. T. BELT.